Figure 1:
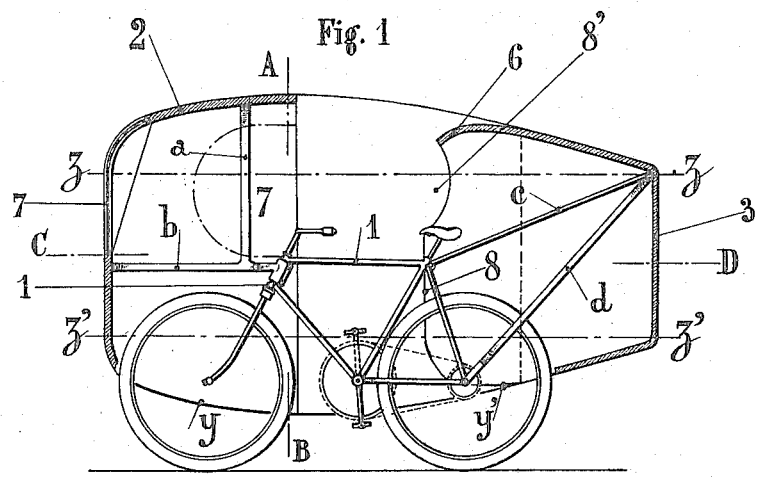

E. BUNAU-VARILLA.
WIND DIVIDING APPARATUS FOR TRANSPORT VEHICLES WITH KINEMATIC EQUILIBRIUM.
APPLICATION FILED OCT. 23, 1913.

1,135,337.

Patented Apr. 13, 1915.
2 SHEETS—SHEET 1.

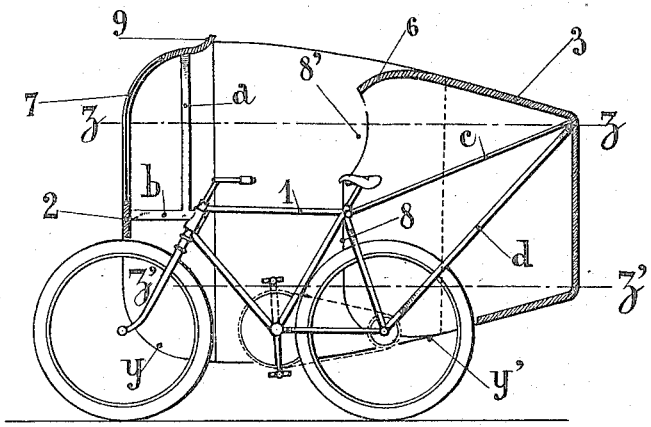
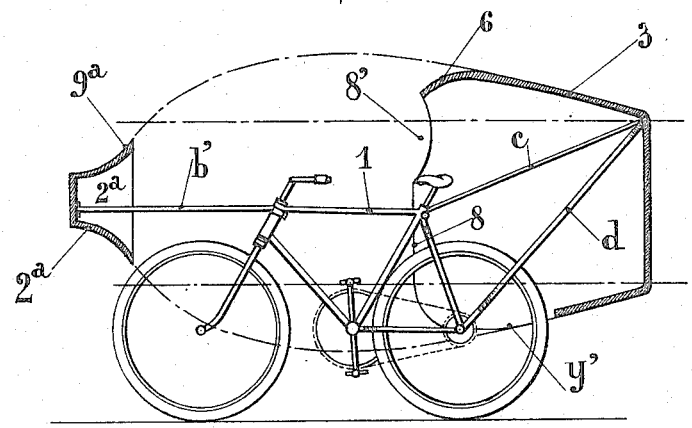
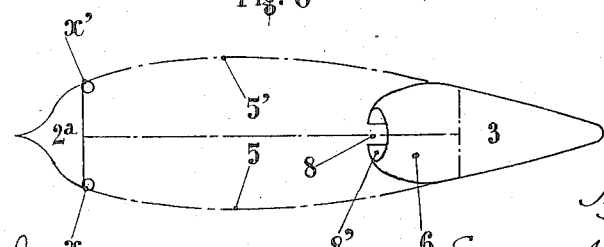

UNITED STATES PATENT OFFICE.

ETIENNE BUNAU-VARILLA, OF PARIS, FRANCE.

WIND-DIVIDING APPARATUS FOR TRANSPORT-VEHICLES WITH KINEMATIC EQUILIBRIUM.

1,135,337.  Specification of Letters Patent.  Patented Apr. 13, 1915.

Application filed October 23, 1913.  Serial No. 796,958.

*To all whom it may concern:*

Be it known that I, ETIENNE BUNAU-VARILLA, citizen of the Republic of France, residing at Paris, France, have invented new and useful Improvements in Wind-Dividing Apparatus for Transport - Vehicles with Kinematic Equilibrium, of which the following is a specification.

The object of this invention is to provide a wind dividing apparatus to be attached to transport vehicles with kinematic equilibrium, especially bicycles and motor-cycles, with a view of diminishing the air resistance by convenient forms.

It is old to facilitate the displacement of moving bodies by substituting for their surfaces, or by placing before the surfaces which result from the construction of the machine or are determined by the person by whom it is occupied, enveloping surfaces of such a form as to facilitate penetrating the air, and to avoid the forming of eddies at the rear of the moving body. For a number of years—and more especially during the last few years, as a consequence of the study of aviation,—this object has been attained by a number of different methods which have been applied in connection with traveling vehicles of a stable equilibrium, such as motor-cars and the like.

The present invention has for its object to reduce the theoretical fusiform body which determines an easy penetration and passage through the air with the least resistance to a front part and a rear part, while leaving between them a space for gaining access to the machine. This space is necessary for vehicles with kinematic equilibrium, as in this case, because of the instability of the vehicles at rest, which requires great rapidity on the part of the cyclist in setting the vehicle in motion, as well as in dismounting when stopping. The space between the front and rear parts is as much reduced as possible, so that the whole forms in effect a single body in the air. The space in question can, if necessary, be protected against the rushing in of oblique air squalls by two wings, prolongations or wing shells, attached by means of hinges and connecting the front or penetrating part with the rear or recovering part, thus guiding the displaced air streams more perfectly from the front to the recovering cone. The rear recovering cone has, in addition, an auxiliary penetrating cone which serves to evacuate from the recovering cone superfluous air streams accidentally introduced. The front and the rear part of the complete penetration body are attached to the frame of the machine by means of any suitable attaching or fixing method, and this complete penetration body behaves, in penetrating the air, in the same manner as if the fusiform body were entirely complete and consisted of a single piece.

The attached drawings illustrate various expressions of the inventive idea.

Figure 2:
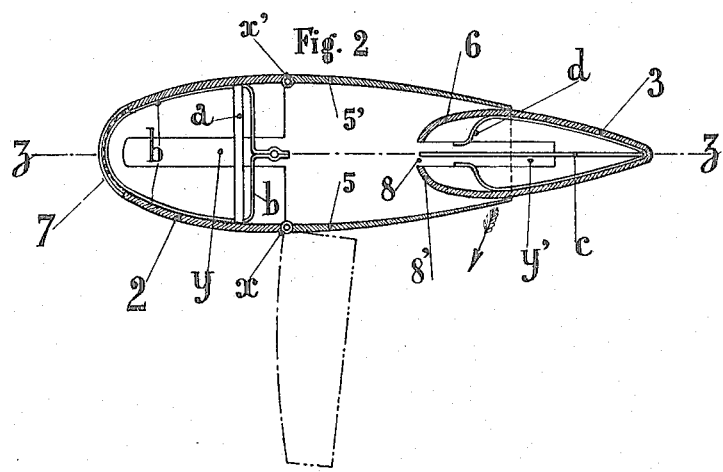
Figure 3:
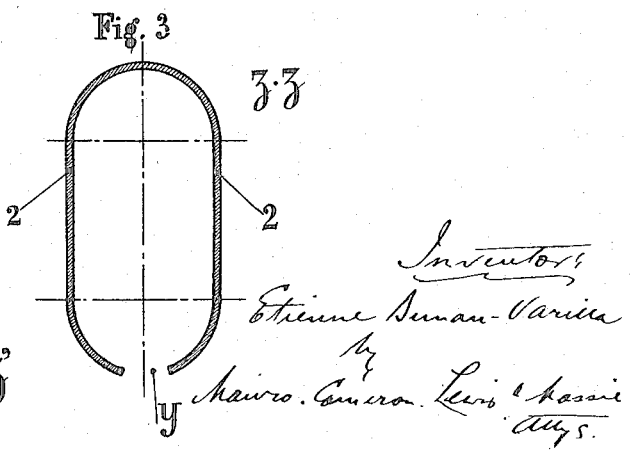

In said drawings—Figure 1 is a longitudinal section of a wind-dividing apparatus, arranged so that it completely surrounds the machine as well as the person mounted thereon; Fig. 2 is a horizontal section on the line C—D of Fig. 1; Fig. 3 is a transverse section on the line A—B of Fig. 1; Fig. 4 shows in longitudinal section a modification in which the front wheel of the machine is not completely surrounded by the front part of the wind-dividing apparatus; and Figs. 5 and 6 show, in longitudinal section and in plan respectively, a wind-dividing apparatus in which the rear part is larger than the front part.

In the drawings the cycle or other device having kinematic equilibrium, is indicated by the numeral 1.

The wind-dividing apparatus, represented in Figs. 1 to 3, consists of a front penetrating part 2, or wind-divider, strictly speaking, and a rear or recovering part 3, leaving between them a free space for gaining access to the machine. To the front part are attached wing members, prolongations or wing shells 5, 5′, closing aft and against the rear part 3 when the machine is in motion. The air streams divided by the penetrating cone 2 are thus perfectly guided, and the cyclist is protected from lateral wind squalls. Although these wings, prolongations or wing-shells close under the influence of the motion, they can be arranged to close automatically as soon as the cyclist has taken his place or at any time, as desired. Whatever the arrangement may be, the constitution of these wings, prolongations or wing shells is preferably of the same nature as that of the parts 2 and 3, and their support or joining to the part 2 can be effected in any convenient manner. As shown in Figs. 1-4 inclusive, the part 2 is provided with iron braces *a* and *b*, a prolongation of the latter extending around and being secured to the front bar of the machine. The rear part 3 is provided with braces or bars *c* and *d*, one of which is secured to the rear of the frame of the machine near the seat, and the other to the axle on which the rear wheel rotates. It is obvious, however, that any other suitable mountings for the parts 2 and 3 may be employed. The part 3 has at its front a penetrating cone 6 arranged in the same direction as part 2. This cone 6 is provided with a slot or opening 8 forming an extension of opening *y'* in rear part 3, these openings accommodating the rear wheel and the seat of the machine, and said opening 8 may be enlarged at 8' to accommodate the whole or part of the body of the rider. The function of this auxiliary penetrating cone 6 is to divert the air streams which tend to rush into the interior and to guide them toward the recovering cone. Further, the transparent windows 7, formed at the sides and at the front of the air-dividing apparatus, allow the cyclist to see and to steer.

In the modification represented in Fig. 4 the front part 2 does not completely inclose the front wheel of the machine, but the wheel passes through an appropriate opening *y* and projects in front. This opening is of such a nature as to allow the wheel to make its movements freely. A shutter following the movements of the wheel closes the opening in question. Further, there is provided at the upper part of the wing members, prolongations or wing shells, at the place where they meet, another opening which allows the cyclist to sit erect, if he so wishes; and to avoid his being incommoded by air currents diverted by the front part 2 of the apparatus, a screen 9 is formed on or attached to the back of part 2, and gives a sudden shift to the wind.

The arrangement represented in Figs. 5 and 6 provides a rear part 3 which is larger than the front part 2. In this case the small front part 2ª has a concave surface of a parabolical form, more or less extended and curved. It is attached to the frame of the machine in any convenient manner, as by a rod *b'*. The concave curve of the front part 2ª insures the penetration and passage through the air with the least resistance; further its enlarged screen 9ª creates a shift of the air and thereby a calm zone between the front and rear part where the cyclist is situated. The field of the air currents which the reduced part 2ª forms surrounds completely the apparatus and meets over the body of the cyclist, even if there are no wing members, prolongations or wing shells, the rear part 3 being adapted for its recovery and provided with an auxiliary penetrating cone 6. If desired, wing members may be pivoted at *x, x'*.

The parts 2 and 3, as well as the wing members, prolongations or wing shells 5, 5', when these latter are employed, can be made of molded, embossed or stamped material conveniently ribbed and braced and provided with any protective or waterproofing means. Further, the wind-dividing apparatus can be constructed in such a manner as to permit it to be folded, rolled or assembled, so as to cause it to occupy the least possible space, and so that it can be attached to the baggage of the cyclist. The front part or penetration cone 2 and the rear part or recovery cone 3, with its auxiliary cone 6, are of any suitable form. As shown in Figs. 1, 2 and 3, the shape is semicircular, the lines *z—z* and *z'—z'* being the respective axes.

While, for the purpose of illustration, various expressions of the inventive idea have been shown, it is to be understood that the invention is not limited to the construction illustrated, but that the inventive idea is susceptible of various mechanical expressions within the limits of the appended claims.

What is claimed is:—

1. In combination, a vehicle having kinematic equilibrium and a wind-dividing apparatus secured thereto, said apparatus consisting of a front part and a rear part, a space being left between said parts to permit the rider to mount the machine.

2. In combination, a vehicle having kinematic equilibrium and a wind-dividing apparatus secured thereto, said apparatus consisting of a front part which tapers toward the front and a rear part which tapers toward the rear, a space being left between said parts to permit the rider to mount the machine.

3. In combination, a vehicle having kinematic equilibrium and a wind-dividing apparatus secured thereto, said apparatus consisting of a front penetration cone and a rear recovery cone, a space being left between said parts to permit the rider to mount the machine.

4. In combination, a vehicle having kinematic equilibrium and a wind-dividing apparatus secured thereto, said apparatus consisting of a front part and a rear part, a space being left between said parts to permit the rider to mount the machine, and members spanning said space to guide the air streams which are divided by said front part.

5. In combination, a vehicle having kinematic equilibrium and a wind-dividing apparatus secured thereto, said apparatus consisting of a front part which tapers toward the front and a rear part which tapers toward the rear, a space being left between said parts to permit the rider to mount the machine, and members spanning said space to guide the air streams which are divided by said front part.

6. In combination, a vehicle having kinematic equilibrium and a wind-dividing apparatus secured thereto, said apparatus consisting of a front penetration cone and a rear recovery cone, a space being left between said parts to permit the rider to mount the machine, and members spanning said space to guide the air streams which are divided by said front penetration cone.

7. In combination, a vehicle having kinematic equilibrium and a wind-dividing apparatus secured thereto, said apparatus consisting of a front penetration cone and a rear recovery cone, a space being left between said parts to permit the rider to mount the machine, and members pivoted to the front penetration cone and spanning said space.

8. In combination, a vehicle having kinematic equilibrium and a wind-dividing apparatus secured thereto, said apparatus consisting of a front penetration cone and a rear recovery cone, a space being left between said parts to permit the rider to mount the machine, and a member on each side of the machine pivoted to said front penetration cone and spanning said space, the free ends of said members engaging said rear recovery cone.

9. In combination, a vehicle having kinematic equilibrium and a wind-dividing apparatus secured thereto, said apparatus consisting of a front part and a rear part, a space being left between said parts to permit the rider to mount the machine, and an auxiliary penetration member associated with said rear part and acting to divert air toward the rear of the apparatus.

10. In combination, a vehicle having kinematic equilibrium and a wind-dividing apparatus secured thereto, said apparatus consisting of a front part which tapers toward the front and a rear part which tapers toward the rear, a space being left between said parts to permit the rider to mount the machine, and an auxiliary penetration member associated with said rear part and acting to divert air toward the rear of the apparatus.

11. In combination, a vehicle having kinematic equilibrium and a wind-dividing apparatus secured thereto, said apparatus consisting of a front penetration cone and a rear recovery cone, a space being left between said parts to permit the rider to mount the machine, and an auxiliary penetration cone associated with said read cone and acting to divert air toward the rear of the apparatus.

12. In combination, a vehicle having kinematic equilibrium and a wind-dividing apparatus secured thereto, said apparatus consisting of a front penetration cone and a rear recovery cone, a space being left between said parts to permit the rider to mount the machine, and an auxiliary member provided at the front of said recovery cone to divert air streams toward the rear of the apparatus.

13. In combination, a vehicle having kinematic equilibrium and a wind-dividing apparatus secured thereto, said apparatus consisting of a front part and a rear part, a space being left between said parts to permit the rider to mount the machine, members spanning said space to guide the air streams which are divided by said front part, and an auxiliary penetration member associated with said rear part and acting to divert air toward the rear of the apparatus.

14. In combination, a vehicle having kinematic equilibrium and a wind-dividing apparatus secured thereto, said apparatus consisting of a front part which tapers toward the front and a rear part which tapers toward the rear, a space being left between said parts to permit the rider to mount the machine, members spanning said space to guide the air streams which are divided by said front part, and an auxiliary penetration member associated with said rear part and acting to divert air toward the rear of the apparatus.

15. In combination, a vehicle having kinematic equilibrium and a wind-dividing apparatus secured thereto, said apparatus consisting of a front penetration cone and a rear recovery cone, a space being left between said parts to permit the rider to mount the machine, members spanning said space to guide the air streams which are divided by said front penetration cone, and an auxiliary penetration member associated with said rear part and acting to divert air toward the rear of the apparatus.

16. In combination, a vehicle having kinematic equilibrium and a wind-dividing apparatus secured thereto, said apparatus consisting of a front penetration cone and a rear recovery cone, a space being left between said parts to permit the rider to mount the machine, members pivoted to the front penetration cone and spanning said space, and an auxiliary penetration member associated with said rear part and acting to divert air toward the rear of the apparatus.

17. In combination, a vehicle having kinematic equilibrium and a wind-dividing apparatus secured thereto, said apparatus consisting of a front penetration cone and a rear recovery cone, a space being left between said parts to permit the rider to mount the machine, a member on each side of the machine pivoted to said front penetration cone and spanning said space, the free ends of said members engaging said rear recovery cone, and an auxiliary cone provided at the front of said rear cone to divert air streams toward the rear of the apparatus.

18. In combination, a vehicle having kinematic equilibrium and a wind-dividing apparatus secured thereto, said apparatus consisting of a front part, a rear part which is separated from said front part, and members or wings secured to one of said parts and engaging the other and provided with an opening which allows the rider to sit erect.

19. In combination, a vehicle having kinematic equilibrium and a wind-dividing apparatus secured thereto, said apparatus consisting of a front part, a rear part which is separated from said front part, and members or wings secured to one of said parts and engaging the other and provided with an opening which allows the rider to sit erect, said front part being provided at its rear with a deflecting portion.

20. In combination, a vehicle having kinematic equilibrium and a wind-dividing apparatus secured thereto, said apparatus consisting of a front part that partially surrounds the front wheel of the vehicle, a rear part which is separated from said front part, and members or wings secured to one of said parts and engaging the other and provided with an opening which allows the rider to sit erect, said front part being provided at its rear with a deflecting portion.

21. In combination, a vehicle having kinematic equilibrium and a wind-dividing apparatus secured thereto, said apparatus consisting of a front part and a rear part having a space between, the front part being smaller than the rear part.

22. In combination, a vehicle having kinematic equilibrium and a wind-dividing apparatus secured thereto, said apparatus consisting of a front part and a rear part having a space between, the front part being smaller than the rear part, and members pivoted to said front part spanning said space and engaging said rear part.

In testimony whereof I have signed my name to this specification in the presence of two subscribing witnesses.

ETIENNE BUNAU-VARILLA.

Witnesses:
LÉON SWANDSEN,
HANSON C. COXE.

Copies of this patent may be obtained for five cents each, by addressing the "Commissioner of Patents, Washington, D. C."